(12) United States Patent
Trubnikov et al.

(10) Patent No.: US 11,043,904 B2
(45) Date of Patent: Jun. 22, 2021

(54) METHOD AND APPARATUS FOR TRANSMISSION OF ELECTRICAL ENERGY

(71) Applicant: FOLQUER HOLDINGS LIMITED, Nicosia (CY)

(72) Inventors: Vladimir Zakharovich Trubnikov, Moscow (RU); Andrey Borisovich Tarasov, Moscow (RU); Oleg Vladimirovich Trubnikov, Moscow (RU)

(73) Assignee: FOLQUER HOLDINGS LIMITED, Nicosia (CY)

( * ) Notice: Subject to any disclaimer, the term of this patent is extended or adjusted under 35 U.S.C. 154(b) by 0 days.

(21) Appl. No.: 17/011,655

(22) Filed: Sep. 3, 2020

(65) Prior Publication Data
US 2021/0083591 A1 Mar. 18, 2021

(30) Foreign Application Priority Data
Sep. 17, 2019 (RU) .......................... RU2019129168

(51) Int. Cl.
*H02M 5/16* (2006.01)
*H02J 50/10* (2016.01)

(52) U.S. Cl.
CPC ............... *H02M 5/16* (2013.01); *H02J 50/10* (2016.02)

(58) Field of Classification Search
CPC ................................... H02M 5/16; H02J 50/10
See application file for complete search history.

(56) References Cited

U.S. PATENT DOCUMENTS

| 593,138 A | 11/1897 | Tesla |
| 2012/0086413 A1* | 4/2012 | Katargin ................ H01F 30/08 323/208 |

FOREIGN PATENT DOCUMENTS

| RU | 2577522 C2 | 3/2016 |
| RU | 2579985 C2 | 4/2016 |
| RU | 2626815 C2 | 8/2017 |

OTHER PUBLICATIONS

Patent application No. RU20190129168 Notice of Allowance including the allowed claims dated Feb. 27, 2020 and the English translation attached herewith.
(Continued)

*Primary Examiner* — Rexford N Barnie
*Assistant Examiner* — Elim Ortiz
(74) *Attorney, Agent, or Firm* — Anglehart et al.

(57) ABSTRACT

The invention relates to electrical engineering, specifically to apparatuses and methods for transmission of electrical energy using resonant techniques between stationary objects, as well as between stationary power sources and movable devices that receive energy. The technical result is achieved by eliminating the occurrence, on the transmission line, of a potential antinode of a standing wave of potential, as well as by eliminating the occurrence, in the transmission line, of a current antinode of a standing wave of current, which fact simplifies operation and reduces the cost of the transmission system, improves environmental situation along the transmission line due to decreased intensity of electrical and magnetic fields, reduces the influence of the capacitance of the conductor of the transmission line on the resonant windings of Tesla transformers.
The use of the proposed invention results in increased efficiency of resonant transmission of electrical energy, and, primarily, over small and medium distances.

50 Claims, 4 Drawing Sheets

(56) References Cited

OTHER PUBLICATIONS

International application No. PCT/IB2020/058555 International Search Report dated Feb. 1, 2021.
International application No. PCT/IB2020/058555 Search Strategy dated Feb. 1, 2021.
International application No. PCT/IB2020/058555 Written Opinion of the International Searching Authority dated Feb. 1, 2021.

* cited by examiner

METHOD AND APPARATUS FOR TRANSMISSION OF ELECTRICAL ENERGY

FIELD OF INVENTION

The invention relates to electrical engineering, specifically to apparatuses and methods for transmission of electrical energy using resonant techniques between fixed objects, as well as between stationary power sources and movable devices that receive electrical energy.

BACKGROUND OF INVENTION

Known are a method and an apparatus for conversion and transmission of electrical energy via a single-wire line over long distances, which were developed by N. Tesla in 1897. (N. Tesla. U.S. Pat. No. 593,138). Electrical Transformer. Filed: Mar. 20, 1897. Granted: Nov. 2, 1897. N. Tesla. U.S. Pat. No. 645,576. System of transmission of electrical energy. Filed: September, 1897. Granted: Mar. 20, 1900.

According to the N. Tesla's inventions, the system consists of two (transmitting and receiving) resonant transformers with resonant step-up windings, which are single-layer spiral quarter-wave segments of long lines on cylindrical formers, and a conductor connecting the high-potential terminals of the resonant step-up windings. The low-potential terminals of the resonant quarter-wave windings of the both transformers are grounded immediately near the transformer structures. The low-voltage winding of the transmitting transformer is connected to the output of an elevated-frequency generator, which is the converter of the source energy into the alternating current electrical energy at a frequency that is equal to the resonant frequency of the resonant single-wire electrical energy transmission system. The low-voltage winding of the receiving transformer is connected to the energy-consuming load.

Connecting one of the terminals of the single-layer high-voltage spiral windings to earth, and the other terminals of these windings to a wire connecting the high-voltage terminals of the spiral windings, results in creation of conditions for the occurrence of standing waves of electromagnetic oscillations of electrical current along the high-voltage windings having a wavelength of about 4 times the length of each of the resonant high-voltage spiral windings.

$$\lambda = 4 \cdot l$$

Here: $\lambda$ is the length of a standing wave in the electrical energy transmission system;

$l$ is the length of the spiral high-voltage winding of the N. Tesla's transformer.

One-half of a standing wave of a resonant oscillation is formed along the entire transmission system, i.e. from the grounded low-potential terminal of the high-voltage spiral winding of the transmitting resonant transformer along the resonant winding, as well as the conductor of the single-wire line connecting the high-potential terminals of the high-voltage windings of the transmitting and receiving transformers, along the high-voltage resonant winding of the receiving transformer up to the grounding low-potential terminal of the receiving transformer.

$$\frac{\lambda}{2} = 2 \cdot l + L$$

Here: L is the distance between the resonant transformers.

The standing wave mode is characterized by the fact that the amplitudes of current and voltage oscillations vary in intensity along the electrical energy transmission system. Regions with increased and decreased currents and potentials are formed in the system. The system's regions with maximum current or potential swings are called current or potential antinodes, the regions with minimum or zero amplitudes are called current or potential nodes.

In the N. Tesla's transmission system, the potential antinode is formed at the high-potential terminals of transmitting and receiving quarter-wave transformers and a single-wire electrical energy transmission line. The current node is also located here. Current antinodes are located on the low-potential portions and terminals of quarter-wave transformers and in the grounding connections of low-potential terminals thereof.

Disposing the current node on the transmitting line significantly reduces the current in the electrical energy transmission line, which fact contributes to sharply reduced losses during energy transmission and is an advantage of the method. A disadvantage of the known method for transmission of electrical energy is high susceptibility to degradation of the wave transmission mechanism under increased transmission distance. Thereby, the capacitance of the ground conductor of the transmission line is increased. The capacitance of the ground conductor of the transmission line is provided to be connected in parallel with the quarter-wave windings of the resonant transformers. When the capacitance of the transmitting ground conductor reaches the ground capacitance of the resonant windings, the transformer loses wave properties, and, therefore, the potential and current antinodes and nodes disappear. The effects of capacitive short-circuiting are even more intense in the case of transmission of energy via a line configured as a cable. Another disadvantage of the known method is high Joule losses in grounding connections, since antinodes of standing waves of current form therein.

In another known method and apparatus for transmission of electrical energy (Patent of the Russian Federation No. 2572360. Date of filing: Oct. 18, 2013. Granted Jan. 10, 2016. Bul. 1. Authors: Trubnikov V Z., Strebkov D. S., Nekrasov A. I.), electrical energy is transmitted by connecting, using a single-wire line, the high-potential terminals of the N. Tesla's transformers, wherein the both transformers, the transmitting one and the receiving one, are made half-wave.

The low-voltage supply winding of the transmitting transformer, as well as the low-voltage winding of the receiving transformer, are disposed on top of the resonant high-voltage windings, at their midpoints, in the regions of current antinodes. Thus, the requirement for grounding the low-potential terminal is eliminated, and the role of an energy reflector in the middle of the current antinode from one-half of the high-voltage winding is played by the other one-half of the half-wave resonant winding. Thereby, losses in the resonant winding are amenable to a greater extent to calculation during designing than losses in the grounding connection, and, therefore, can be minimized to a large extent, and it also becomes possible to relocate the location of the transmitting transformer, if there is a need to move the transmitting transformer.

The disadvantage of the known method and apparatus is complicated maintenance of the apparatus associated with the use, during transmission, of very high potentials on the transmitting line.

The closest solution to the proposed one is a known resonant method and apparatus for transmission of electrical energy by creating elevated-frequency resonant oscillations and two high-frequency resonant transformers, a step-up transformer and a step-down transformer, the resonant high-frequency windings of which are connected to solitary electrically conductive spheres raised above the earth's surface and above the spiral windings to a height that allows the spheres to operate as solitary electrical capacitors, the electrical fields of which weakly interact with those of the single-layer spiral windings, and the single-wire electrical energy transmission line is included between the low-potential terminals of the transmitting and receiving Tesla transformers. Using an exciting low-voltage winding, resonant oscillations with a current antinode at the low-potential terminal are excited in the resonant winding of the Tesla transmitting transformer, the current antinode supplies the single-wire line, electromagnetic energy is transmitted along the single-wire line to the N. Tesla's receiving transformer (Patent of the Russian Federation No. 2577522. Date of filing: May 19, 2014. Granted: Mar. 20, 2016. Bul. No. 8 Authors: Trubnikov V. Z., Strebkov D. S., Nekrasov A. I., Rutskoi A. S., Moiseev M. V.)

The disadvantage of the known method and apparatus is the presence, on the transmission line, of a current antinode and associated therewith increased Joule losses in the transmission line.

The objective of the proposed invention is to increase the efficiency of resonant transmission of electrical energy, primarily, over small and medium distances, reduce the influence of the capacitance of the conductor of the transmission line on the resonant windings of the transmitting and receiving quarter-wave Tesla transformers, reduce electrical losses in grounding connections, simplify the design of the resonant transformers.

DISCLOSURE OF INVENTION

The use of the proposed invention results in increased efficiency of resonant transmission of electrical energy, primarily, over small and medium distances, by using a wave mechanism of energy transmission by elevated-frequency currents when using, in the transmission line, currents that are significantly less than those when transmitting energy by current antinodes, as well as by using a wave mechanism of transmission of energy in the presence, on the transmission line, of potential that is significantly less than that when transmitting energy by a potential antinode, wherein the high-potential terminals of the resonant transformers remain unconnected, the low-potential terminals are grounded.

The fact that, in the proposed method, there is no potential antinode on the transmission line, as well as no antinode current, simplifies operation and reduces the cost of the transmission system, improves the environmental situation along the transmission line due to decreased intensity of electrical and magnetic fields, simplifies the matching of cable lines with the Tesla transformers.

The above technical result is achieved by the fact that the method of transmission of electrical energy, comprising:

transmitting electrical energy from the source of electrical energy to the receiver of electrical energy using a frequency converter for converting electrical current from the source of electrical energy to elevated-frequency electrical current, transmitting and receiving resonant Tesla transformers, the low-potential terminals of the windings of said transformers being grounded, and an electrical energy transmission line, wherein the transmission line is included between the stationary or movable points of the resonant windings of the transmitting and receiving transformers, the output resistance in which is equal in absolute value to the input or output resistance of the transmission line, the frequency converter is connected to the transmitting transformer via an electrical capacitor using a coupling winding magnetically-inductively coupled to the winding of the transmitting transformer, the receiver of electrical energy is connected to the receiving transformer via an electrical capacitor using a coupling winding magnetically-inductively coupled to the winding of the receiving transformer, and said method further comprises:

excitating, by means of electrical energy from the source of electrical energy, in the winding of the transmitting transformer, resonant oscillations with the provision of excitation of electrical current in the transmission line, transmitting the energy via the transmission line to the winding of the receiving transformer with excitation therein of resonant oscillations, which fact ensures transmission of energy from the receiving transformer to the receiver of electrical energy.

In another method for transmission of electrical energy, the energy is transmitted to the receiver of electrical energy further via a current inverter converting the energy of elevated-frequency current into the energy of electrical current suitable for supplying the load.

In yet another method for transmission of electrical energy, the high-potential terminals of the windings of the transmitting and receiving transformers are connected to solitary capacitors. Spheres, toroids, long sections of conductors, metal plates and the like can be used as solitary capacitors.

Yet another method for transmission of electrical energy contemplates the operation of the transmission line in the mode of a half-wave single-wire transmission line.

Furthermore, used can be a method for transmission of electrical energy, comprising:

transmitting electrical energy from the source of electrical energy to the receiver of electrical energy using a frequency converter for converting electrical current from the source of electrical energy to elevated-frequency electrical current, transmitting and receiving resonant Tesla transformers and an electrical energy transmission line, wherein the transmission line is included between the stationary or movable points of the resonant windings of the transmitting and receiving transformers, the output resistance in which corresponds to the input or output resistance of the transmission line, the frequency converter is included between the low-potential terminal of the resonant winding of the transmitting transformer and the grounding connection, the receiver of electrical energy is included between the low-potential terminal of the resonant winding of the receiving transformer and the grounding connection, and said method further comprises: excitating, by means of electrical energy from the source of electrical energy, in the winding of the transmitting transformer, resonant oscillations with the provision of excitation of electrical current in the transmission line, and transmitting the energy via the transmission line to the winding of the receiving transformer with excitation therein of resonant oscillations, which fact ensures transmission of energy from the receiving transformer to the receiver of electrical energy.

A similar one to the above method is a method for transmission of electrical energy, according to which the receiver of electrical energy is connected to the low-potential terminal of the resonant winding of the receiving transformer via a current inverter converting the energy of elevated-frequency current into the energy of electrical current suitable for supplying the load.

In addition, further provided is a method for transmission of electrical energy, according to which the high-potential terminals of the resonant windings of the transmitting and receiving transformers are connected to solitary capacitors. Spheres, toroids, long sections of conductors, metal plates and the like can be used as solitary capacitors.

Yet another method for transmission of electrical energy contemplates the operation of the transmission line in the mode of a half-wave single-wire transmission line.

Further provided is a method for transmission of electrical energy, comprising:

transmitting electrical energy from the source of electrical energy to the receiver of electrical energy using a frequency converter for converting electrical current from the source of electrical energy to elevated-frequency electrical current, transmitting and receiving resonant Tesla transformers and two electrical energy transmission lines, wherein the both transmission lines are included between the stationary or movable points of the resonant windings of the transmitting and receiving transformers, the output resistance in which corresponds to the input or output resistance of the transmission line, the frequency converter is connected to the transmitting transformer via electrical capacitors using a coupling winding magnetically-inductively coupled to the winding of the transmitting transformer, the receiver of electrical energy is connected to the receiving transformer via electrical capacitors using a coupling winding magnetically-inductively coupled to the half-wave winding of the receiving transformer, and said method further comprises:

excitating, by means of electrical energy from the source of electrical energy, in the winding of the transmitting transformer, resonant oscillations with the provision of excitation of electrical current in the transmission lines, transmitting the energy via the transmission lines to the winding of the receiving transformer with excitation therein of resonant oscillations, which fact ensures transmission of energy from the receiving transformer to the receiver of electrical energy.

As a variation of the previous method for transmission of electrical energy, further provided is a method contemplating the operation of the transmission lines in the mode of half-wave single-wire transmission lines.

In another method for transmission of electrical energy, the single-wire transmission lines are made separately from each other.

In yet another method for transmission of electrical energy, the single-wire transmission lines are made together with each other in the form of an isolated twisted pair with the necessary level of electric strength between the transmission lines and between the transmission lines and ground.

Yet another variation of said methods contemplates the presence of grounding connection in the middle of the windings of the transmitting and receiving Tesla transformers.

Furthermore, there is a variation of the method for transmission, according to which the energy is further transmitted to the receiver of electrical energy via a current inverter converting the energy of elevated-frequency current into the energy of electrical current suitable for supplying the load.

Further provided is a variation of the method for transmission of electrical energy, according to which the high-potential terminals of the windings of the transmitting and receiving transformers are connected to solitary capacitors. Spheres, toroids, long sections of conductors, metal plates and the like can be used as solitary capacitors.

Further provided is yet another basic method for transmission of electrical energy comprising:

transmitting electrical energy from the source of electrical energy to the receiver of electrical energy using a frequency converter for converting electrical current from the source of electrical energy to elevated-frequency electrical current, transmitting and receiving resonant Tesla transformers and two electrical energy transmission lines, wherein the both transmission lines are included between the stationary or movable points of the resonant windings of the transmitting and receiving transformers, the output resistance in which corresponds to the input or output resistance of the transmission line, the frequency converter is connected to the transmitting transformer by way of including the electrical output of the frequency converter in series with the conductor in the resonant winding of the transmitting transformer, the receiver of electrical energy is connected to the receiving transformer by way of including the electrical input of the receiver in series with the conductor in the resonant winding of the receiving transformer; and said method further comprises:

excitating, by means of electrical energy from the source of electrical energy, in the winding of the transmitting transformer, resonant oscillations with the provision of excitation of electrical current in the transmission lines, transmitting the energy via the transmission lines to the winding of the receiving transformer with excitation therein of resonant oscillations, which fact ensures transmission of energy from the receiving transformer to the receiver of electrical energy.

In a variation of this method for transmission of electrical energy, a current inverter is used. Accordingly, the energy is transmitted to the receiver of electrical energy further via a current inverter converting the energy of elevated-frequency current into the energy of electrical current suitable for supplying the load.

According to yet another modification of the basic method for transmission of electrical energy, the transmission lines are half-wave single-wire transmission lines.

Moreover, in a further method for transmission of electrical energy, the single-wire transmission lines are made separately from each other.

In addition, possible is a method for transmission of electrical energy, according to which the single-wire transmission lines are made integral with each other in the form of isolated twisted pair with the required level of electric strength between the transmission lines and between the transmission lines and ground.

Yet another variation of the method for transmission of electrical energy is a method, according to which the high-potential terminals of the windings of the transmitting and receiving transformers are connected to solitary capacitors. Spheres, toroids, long sections of conductors, metal plates and the like can be used as solitary capacitors.

An apparatus for transmission of electrical energy, comprising:

transmitting electrical energy from the source of electrical energy to the receiver of electrical energy using a frequency converter for converting electrical current from the source of electrical energy to elevated-frequency electrical current, transmitting and receiving resonant Tesla transformers, the low-potential terminals of the windings of said transformers being grounded, and an electrical energy transmission line, wherein the transmission line is included between the stationary or movable points of the resonant windings of the transmitting and receiving transformers, the output resistance in which is equal in absolute value to the input or output resistance of the transmission line, the frequency converter is connected to the transmitting transformer via an electrical capacitor using a coupling winding magnetically-inductively coupled to the winding of the transmitting transformer, the receiver of electrical energy is connected to the receiving transformer via an electrical capacitor using a coupling winding magnetically-inductively coupled to the winding of the receiving transformer, and said apparatus further comprises:

excitating, by means of electrical energy from the source of electrical energy, in the winding of the transmitting transformer, resonant oscillations with the provision of excitation of electrical current in the transmission line, transmitting the energy via the transmission line to the winding of the receiving transformer with excitation therein of resonant oscillations, which fact ensures transmission of energy from the receiving transformer to the receiver of electrical energy.

In another apparatus for transmission of electrical energy, the energy is transmitted to the receiver of electrical energy further via a current inverter converting the energy of elevated-frequency current into the energy of electrical current suitable for supplying the load.

In yet another apparatus for transmission of electrical energy, the high-potential terminals of the windings of the transmitting and receiving transformers are connected to solitary capacitors. Spheres, toroids, long sections of conductors, metal plates and the like can be used as solitary capacitors.

Yet another apparatus for transmission of electrical energy contemplates the operation of the transmission line in the mode of a half-wave single-wire transmission line.

Furthermore, used can be an apparatus for transmission of electrical energy, comprising:

transmitting electrical energy from the source of electrical energy to the receiver of electrical energy using a frequency converter for converting electrical current from the source of electrical energy to elevated-frequency electrical current, transmitting and receiving resonant Tesla transformers and an electrical energy transmission line, wherein the transmission line is included between the stationary or movable points of the resonant windings of the transmitting and receiving transformers, the output resistance in which corresponds to the input or output resistance of the transmission line, the frequency converter is included between the low-potential terminal of the resonant winding of the transmitting transformer and the grounding connection, the receiver of electrical energy is included between the low-potential terminal of the resonant winding of the receiving transformer and the grounding connection, and said apparatus further comprises: excitating, by means of electrical energy from the source of electrical energy, in the winding of the transmitting transformer, resonant oscillations with the provision of excitation of electrical current in the transmission line, and transmitting the energy via the transmission line to the winding of the receiving transformer with excitation therein of resonant oscillations, which fact ensures transmission of energy from the receiving transformer to the receiver of electrical energy.

A similar one to the above apparatus is an apparatus for transmission of electrical energy, according to which the receiver of electrical energy is connected to the low-potential terminal of the resonant winding of the receiving transformer via a current inverter converting the energy of elevated-frequency current into the energy of electrical current suitable for supplying the load.

In addition, further provided is an apparatus for transmission of electrical energy, according to which the high-potential terminals of the resonant windings of the transmitting and receiving transformers are connected to solitary capacitors. Spheres, toroids, long sections of conductors, metal plates and the like can be used as solitary capacitors.

Yet another apparatus for transmission of electrical energy contemplates the operation of the transmission line in the mode of a half-wave single-wire transmission line.

Further provided is an apparatus for transmission of electrical energy, comprising:

transmitting electrical energy from the source of electrical energy to the receiver of electrical energy using a frequency converter for converting electrical current from the source of electrical energy to elevated-frequency electrical current, transmitting and receiving resonant Tesla transformers and two electrical energy transmission lines, wherein the both transmission lines are included between the stationary or movable points of the resonant windings of the transmitting and receiving transformers, the output resistance in which corresponds to the input or output resistance of the transmission line, the frequency converter is connected to the transmitting transformer via electrical capacitors using a coupling winding magnetically-inductively coupled to the winding of the transmitting transformer, the receiver of electrical energy is connected to the receiving transformer via electrical capacitors using a coupling winding magnetically-inductively coupled to the half-wave winding of the receiving transformer, and said apparatus further comprises:

excitating, by means of electrical energy from the source of electrical energy, in the winding of the transmitting transformer, resonant oscillations with the provision of excitation of electrical current in the transmission lines, transmitting the energy via the transmission lines to the winding of the receiving transformer with excitation therein of resonant oscillations, which fact ensures transmission of energy from the receiving transformer to the receiver of electrical energy.

As a variation of the previous apparatus for transmission of electrical energy, further provided is an apparatus contemplating the operation of the transmission lines in the mode of half-wave single-wire transmission lines.

In another apparatus for transmission of electrical energy, the single-wire transmission lines are made separately from each other.

In yet another apparatus for transmission of electrical energy, the single-wire transmission lines are made together with each other in the form of an isolated twisted pair with the necessary level of electric strength between the transmission lines and between the transmission lines and ground. Yet another variation of said apparatuses contemplates the presence of grounding connection in the middle of the windings of the transmitting and receiving Tesla transformers.

Furthermore, there is a variation of the apparatus for transmission, according to which the energy is further transmitted to the receiver of electrical energy via a current inverter converting the energy of elevated-frequency current into the energy of electrical current suitable for supplying the load.

Further provided is a variation of the apparatus for transmission of electrical energy, according to which the high-potential terminals of the windings of the transmitting and receiving transformers are connected to solitary capacitors. Spheres, toroids, long sections of conductors, metal plates and the like can be used as solitary capacitors.

Further provided is yet another basic apparatus for transmission of electrical energy comprising:

transmitting electrical energy from the source of electrical energy to the receiver of electrical energy using a frequency converter for converting electrical current from the source of electrical energy to elevated-frequency electrical current, transmitting and receiving resonant Tesla transformers and two electrical energy transmission lines, wherein the both transmission lines are included between the stationary or movable points of the resonant windings of the transmitting and receiving transformers, the output resistance in which corresponds to the input or output resistance of the transmission line, the frequency converter is connected to the transmitting transformer by way of including the electrical output of the frequency converter in series with the conductor in the resonant winding of the transmitting transformer, the receiver of electrical energy is connected to the receiving transformer by way of including the electrical input of the receiver in series with the conductor in the resonant winding of the receiving transformer; and said apparatus further comprises:

excitating, by means of electrical energy from the source of electrical energy, in the winding of the transmitting transformer, resonant oscillations with the provision of excitation of electrical current in the transmission lines, transmitting the energy via the transmission lines to the winding of the receiving transformer with excitation therein of resonant oscillations, which fact ensures transmission of energy from the receiving transformer to the receiver of electrical energy.

In a variation of this apparatus for transmission of electrical energy, a current inverter is used. Accordingly, the energy is transmitted to the receiver of electrical energy further via a current inverter converting the energy of elevated-frequency current into the energy of electrical current suitable for supplying the load.

According to yet another modification of the basic apparatus for transmission of electrical energy, the transmission lines are half-wave single-wire transmission lines.

Moreover, in a further apparatus for transmission of electrical energy, the single-wire transmission lines are made separately from each other.

In addition, there is provided an apparatus for transmission of electrical energy, according to which the single-wire transmission lines are made integral with each other in the form of isolated twisted pair with the required level of electric strength between the transmission lines and between the transmission lines and ground.

Yet another variation of the apparatus for transmission of electrical energy is an apparatus, according to which the high-potential terminals of the windings of the transmitting and receiving transformers are connected to solitary capacitors. Spheres, toroids, long sections of conductors, metal plates and the like can be used as solitary capacitors.

The essence of the proposed inventions is explained by FIG. 1-FIG. 6.

BRIEF DESCRIPTION OF DRAWINGS

FIG. 1 is a schematic diagram of electrical connections for implementing the method and apparatus for transmission of electrical energy using two quarter-wave resonant Tesla transformers. The low-potential terminals of the resonant windings of the transmitting and receiving transformers are grounded, the high-potential terminals of the quarter-wave windings are remained unconnected. Electrical energy from the source of energy to the transmitting Tesla transformer is transmitted via a frequency converter, via an electrical capacitor and a low-voltage pumping winding, which provides magnetic-induction transmission of electrical energy to the region of current antinode of the quarter-wave resonant winding. Electrical energy from the transmitting transformer to the receiving transformer is transmitted using a single-wire transmission line between points A and B of the resonant windings of the transformers. The output resistance of the windings at points A and B is equal in absolute value to the wave resistance of the transmission line at the input and output of same. Electrical energy from the receiving transformer to the load is transmitted via an electrical capacitor using the magnetic-induction energy drain winding located in the region of current antinode of the resonant quarter-wave winding of the receiving Tesla transformer.

FIG. 2 is a schematic diagram of electrical connections for implementing the method and apparatus for transmission of electrical energy using two quarter-wave resonant Tesla transformers. The high-potential terminals of the resonant windings of the transmitting and receiving transformers are remained unconnected. The frequency converter with electrical output thereof is included immediately between the low-potential output and the grounding connection of the transmitting transformer. The load is included immediately between the low-potential terminal of the receiving transformer and the grounding connection. Electrical energy between the resonant quarter-wave Tesla transformers is transmitted using a single-wire transmission line between points A and B located on the quarter-wave windings at points where the output resistance of the windings is equal in absolute value to the resistance of the transmission line at the input of same.

FIG. 4 is a schematic diagram of electrical connections for implementing the method and apparatus for transmission of electrical energy from the source of electrical energy to the receiver of electrical energy using transmitting and receiving half-wave Tesla transformers and two single-wire transmission lines. The transmission of electrical energy from the frequency converter to the transmitting resonant transformer, as well as of energy from the receiving transformer to the load or to the inverter, is implemented via electrical capacitors using magnetic-induction windings. The high-potential terminals of half-wave resonant windings are remained unconnected. The beginning and ends of the two single-wire transmission lines are connected to points A, B, C, D on the half-wave windings of the resonant transformers, the output resistance in which is equal in absolute value to the wave resistances of the single-wire transmission lines at inputs and outputs of same.

FIG. 5 is a schematic diagram of electrical connections for implementing the method and apparatus for transmission of electrical energy from the source of electrical energy to the receiver using two half-wave Tesla transformers and two single-wire electrical energy transmission lines. The frequency converter and the load, or the inverter, are included immediately in series with the resonant half-wave windings. The single-wire transmission lines with beginnings and ends thereof are connected to the half-wave resonant windings of the Tesla transformers at points A, B, C, D, the output resistance in which is equal in absolute value to the wave resistances of the transmission line at inputs and outputs of same. One one-half of a standing wave of current rests on each one of the single-wire transmission lines, at the frequency of resonance of the half-wave windings.

EMBODIMENT OF INVENTION

Figure 1:
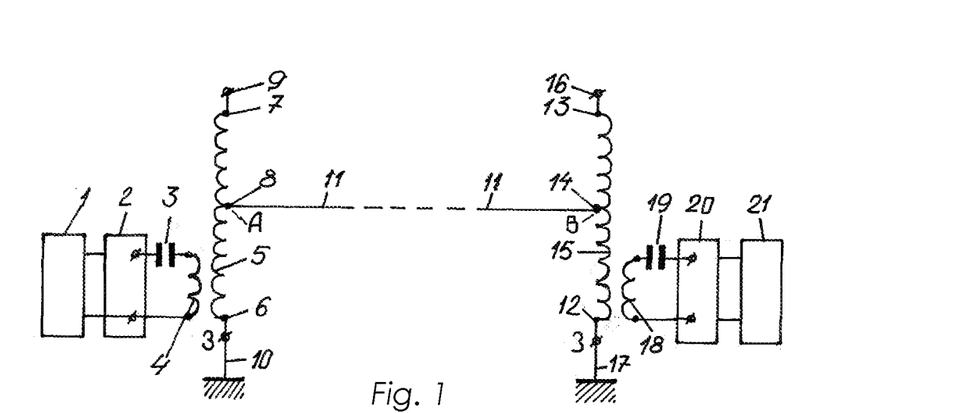

FIG. 1 is an electrical diagram of the method and apparatus for transmission of electrical energy, where 1 is the source of electrical energy, 2 is the converter of electrical energy from the format of the source 1 to the format of alternating current of elevated and controlled frequency, the current frequency is set so that the following condition is fulfilled: $f_G=f_{01}$. Here, $f_G$ is the current frequency at the converter output, $f_{01}$ is the resonance frequency of the quarter-wave winding 5 of the resonant transmitting Tesla transformer. 3 is an electrical capacitor that, together with a low-voltage winding 4, forms a resonant serial electrical power circuit of the transmitting Tesla transformer. The resonant frequency of the circuit is $f_{P1}=f_{01}$. The low-voltage winding 4 is disposed on top of the quarter-wave winding 5 at the low-potential terminal 6, in the region of current antinode. The high-potential terminal 7 of the winding 5 is electrically connected to the output high-potential terminal 9 of the quarter-wave resonant transmitting Tesla transformer, the terminal 9 is isolated and remained unconnected.

The low-potential terminal 6 of the winding 5 is connected to the grounding terminal 3 of the ground circuit on the transmitting side of the system and is connected to the grounding structure using a conductor 10. The terminal 8 of the winding 5 is arranged in that portion of the winding 5, where, during operation under load, the phases of current and potential are close to each other. The point 8 of the winding 5 is indicated by letter A. It is the beginning of a single wire transmission line 11. The end of the transmission line is point B. Point B is connected to a terminal 14 on the quarter-wave winding 15. In the region of the terminal 14, during operation under load, the phases of current and potential are opposed relative to each other. The low-potential terminal 12 of the quarter-wave winding 15 of the receiving Tesla transformer is connected to the grounding terminal 3 of the ground circuit on the receiving side using a conductor 17 that is electrically connected to the grounding structure. The high-potential terminal 13 of the winding 15 is electrically connected to the output high-potential terminal 16 of the quarter-wave resonant Tesla transformer, the terminal 16 is isolated and remained unconnected. The resonant frequency of the winding 15 is $f_{02}=f_{01}$. In the region of current antinode, a low-voltage winding 18 is disposed over the winding 15. The winding 18 via mutual inductance with the winding 15 "removes" electrical energy and passes same via an electric capacitor 19 to an inverter 20. The winding 18 together with the capacitor 19 forms a serial resonant circuit with its own resonant frequency $f_{P2}$. Whereby, $f_{P2}=f_{02}$. The inverter 20 converts the energy of elevated-frequency electrical current into the energy of alternating current having the format that is required to supply the load 21. If the load 21 is "indifferent" to the format of the supply current, then the inverter 20 is no longer required. In this case, the winding 18 is designed and implemented so as to provide the load 21 with a voltage of the required magnitude. Provided that $f_G=f_{P1}=f_{01}=f_{02}=f_{P2}$, the circuit of the low-voltage supply winding (3, 4), the quarter-wave winding 5 of the transmitting Tesla transformer, the quarter-wave winding 15 of the receiving Tesla transformer and the low-voltage energy-removing circuit (18, 19) operate in the resonant mode. Whereby, circuits (3, 4) and (18, 19) operate in the resonance mode on reactive elements with lumped parameters, and the quarter-wave windings 5 and 15 of the resonant Tesla transformers operate in the resonance mode on the segments of long lines with distributed reactive parameters. Accordingly, standing waves are formed on quarter-wave windings 5 and 15 in the form of quarter-wave implementations with potential antinodes at the terminals 7 and 13 (the terminals 9 and 16 of the Tesla transformers) and potential nodes at the terminals 6 and 12, as well as with current antinodes in the region of the grounding terminal 6 of the transmitting transformer 5 and the grounding terminal 12 of the receiving transformer 15, with current nodes at the terminals 7 of the transmitting transformer 5 and 13, of the receiving transformer 15. Thus, two independent wave objects are excited and coexist on the quarter-wave windings as follows: a quarter of a current wave and a quarter of a potential wave, which are two electrical characteristics of a single energy formation with an equal density per unit length of electromagnetic energy along the resonant winding. Thereby, the shift between the antinodes of current and potential along the windings is λ/4 of a standing wave of current or potential.

The theory and practice of the operation of quarter-wave transformers shows that the phases of current and potential in the nodes and antinodes are shifted, also in time, by T/4 (where T is the period of a current oscillation, T=1/f). Thereby, when moving along the winding, there is observed a rotation of the phases of current and potential in opposite directions such that at some points of the quarter-wave windings, at no load, the phases of current and potential, between the terminals (6, 7) and (12, 13), are the same (on the winding of the transmitting transformer, point 8) or are in antiphase (on the winding of the receiving transformer, point 14). If the line length is λ/2, the electrical energy transmission line 11 is included between points (8 and 14), wherein a most favorable, from the point of view of phase difference between current and voltage, electrical energy transmission mode is created on the transmission line 11.

When loading the load 21, the resonant frequency of the quarter-wave transformer 15 decreases, and the input resistance of the transmission line 11 at point A (line input) changes due to a change in the input resistance of the receiving quarter-wave transformer 15 at point B at the output of the line 11. Thus, there is occurred a mismatch of the output resistance at point 8 of the transmitting transformer 5 and the input resistance of the transmission line 11 at point A. To restore the matching mode, it is necessary to move the connection point 8 on the resonant winding 5. To this end, the tap at point 8 is not made as a single one, but is made as a series of taps along the entire length of the Tesla transformer. In the case of a constant load, the tap is made as a single connection point. In the case of a variable load, when tuning, a connection point that provides the optimal mode for the preferred load range is selected.

A similar situation takes place when changing the design parameters of the transmission line: lengthening or shortening the transmission distance, changing the diameter of a wire, changing the height of a suspension or changing the method, or the depth of embedding of the line into the ground. The input resistance at point A changes when connecting/disconnecting intermediate consumers to the transmission line. In the taps, the output resistance increases in absolute value when the connection point is moved from position 8 towards the high-voltage terminal of the resonant winding 5. Thereby, the resistance is of active-capacitive character. At the high-potential output (point 7), the output resistance reaches a value:

$$|Z_{OUT}| = QZ_W$$

Here: $Z_{OUT}$ is output resistance, absolute value;
$Z_W$ is wave resistance of the winding 5;
Q is quality factor of the winding 5;
The resistance at this point is of capacitive character.

When the connection point is moved from the position 8 towards the low potential terminal 6, the output resistance decreases in absolute value and the resistance character acquires the inductively-active type. The output resistance reaches a minimum value at the point 6:

$$|Z_{OUT}| = \frac{Z_W}{Q}$$

Figure 2:
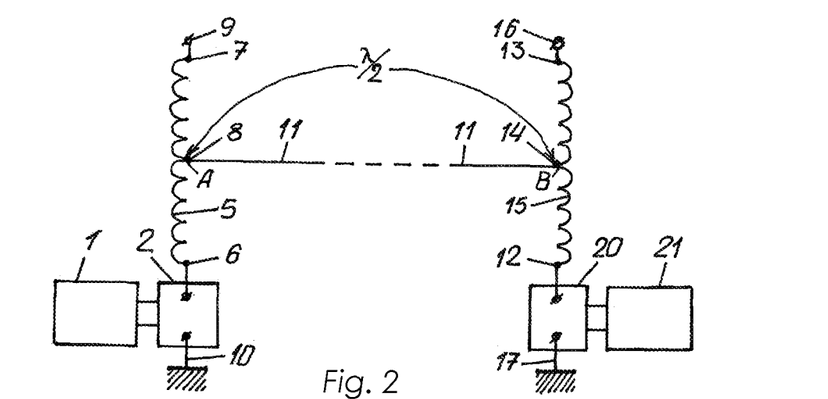

FIG. 2 is a schematic diagram of electrical connections of the method and apparatus for transmission of electrical energy, where 1 is the source of electrical energy, 2 is the frequency converter of the supply current to the current of elevated- and controlled-frequency for supplying a resonant transmission system comprising a transmitting resonant Tesla transformer 5, a receiving resonant Tesla transformer 15. Thereby, the frequency converter 2 is included immediately between the low-potential terminal 6 and the grounding conductor 10 on the transmitting side, the inverter 20 (or load 21) are included immediately between the low potential terminal 12 and the grounding conductor 17 on the receiving side. The electrical energy transmission line 11 is included between points 8 and 14 on the transmitting and receiving windings 5 and 15, i.e. between points A and B of the transmitting and receiving Tesla transformers. The principle of transmission of electrical energy between points A and B and tuning of the system is similar to that of FIG. 1.

Figure 3:
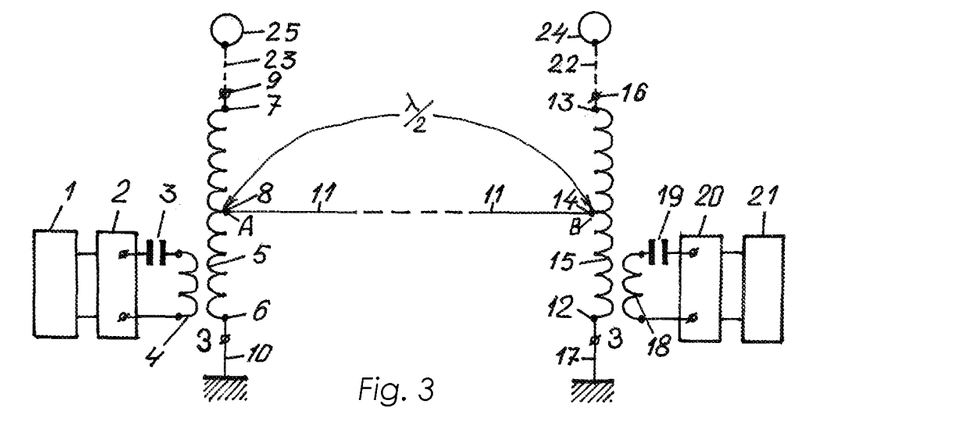
FIG. 3 is a schematic diagram of electrical connections for implementing the method and apparatus for transmission of electrical energy from a transmitting quarter-wave Tesla transformer to a receiving quarter-wave Tesla transformer using a single-wire electrical energy transmission line, the length of the transmission line is one-half of the length of a standing wave excited on the line during the operation of the resonant quarter-wave windings in the resonance mode. Transmission of energy to the transmitting transformer, and of energy from the receiving transformer to the load is implemented via electrical capacitors using magnetic-induction coupling. The high-potential outputs of the resonant windings are connected using conductors to electrically conductive spheres.

FIG. 3 is a schematic diagram of electrical connections of the method and apparatus for transmission of electrical energy, where 1 is the source of electrical energy, 2 is the frequency converter of the supply current to the current of elevated- and controlled-frequency for supplying a resonant transmission system comprising a transmitting resonant Tesla transformer 5 and a receiving resonant Tesla transformer 15. Energy from the frequency converter 2 to the transmitting transformer 5 is transmitted via an electric capacitor 3 using magnetic-induction coupling of a low-voltage winding 4, which forms, together with the capacitor 3, a serial resonant circuit consisting of reactive elements with lumped parameters. Energy is transmitted to the load 21 or to the input of the inverter 20 from the receiving transformer 15 using magnetic-induction mutual coupling of the low-voltage winding 18, which forms, together with the capacitor 19, a serial resonant circuit formed from reactive elements with lumped parameters. The low-potential terminals 6, 12 of the quarter-wave windings 5 and 15 are grounded using conductors 10 and 17 immediately near the transformers. The high-potential terminals 7 and 13, via the high-voltage terminals 9 and 16 using the conductors 23 and 22 are connected to solitary capacitors in the form of spheres 25 and 24. Electrical energy from the transmitting transformer 5 to the receiving transformer 15 is transmitted using a single-wire line 11 connecting point A of transmission of energy and point B of reception of energy via terminals 8 on the transformer 5 and point 14 on the transformer 15.

Figure 4:
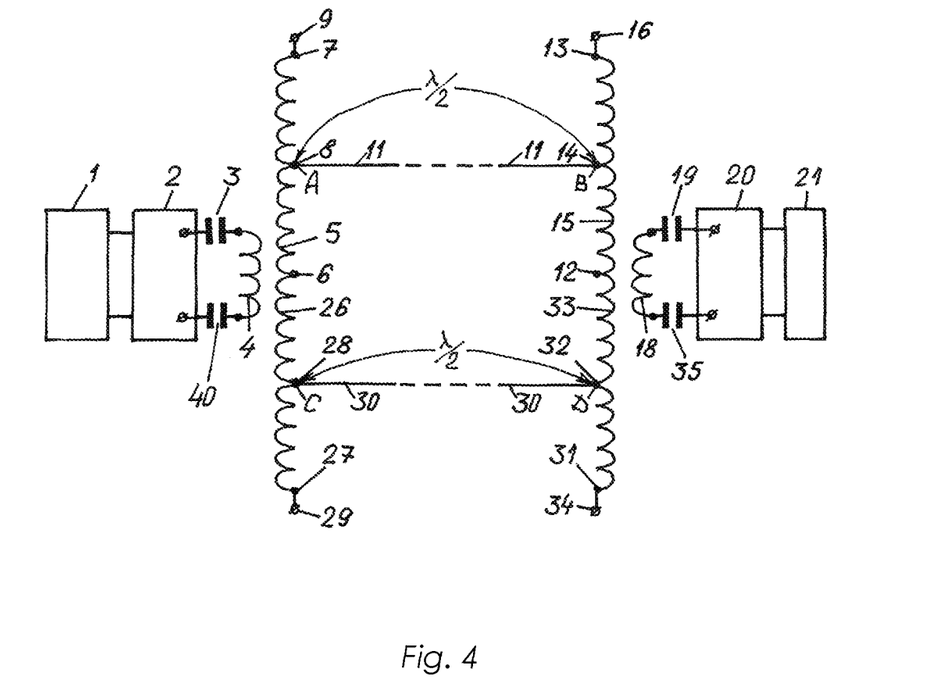

FIG. 4 is a schematic diagram of the electrical connections of the method and apparatus for transmission of electrical energy from the source 1 of energy via a converter 2 using a half-wave transmitting Tesla transformer 5 and a receiving Tesla transformer 15 and two single-wire transmission lines 11 and 30. The energy from the converter 2 to a half-wave resonant winding 5 and from a half-wave resonant winding 15 to the inverter 20 (or to the load 21) is transmitted using magnetic-induction coupling of the low-voltage windings 4 and 18 via the electrical capacitors (3, 40) and (19, 35). The capacitors (3, 40) and (19, 35), together with the low-voltage windings 4 and 18, form serial resonant circuits. The high-potential terminals 7, 13, 27, 31 of the half-wave windings 5 and 15 are connected to the high-voltage terminals 9, 16, 29, 34, respectively, of the resonant half-wave transmitting Tesla transformer 5 and the resonant half-wave receiving Tesla transformer 15. The high-voltage terminals 9, 16, 29, 34 of the transformers 5 and 15 are remained unconnected. The beginnings and ends of the single-wire electric power transmission lines 11 and 30 are connected at points A, C and B, D to taps 8, 14, 28, 32 on the half-wave windings 5 and 15.

Figure 5:
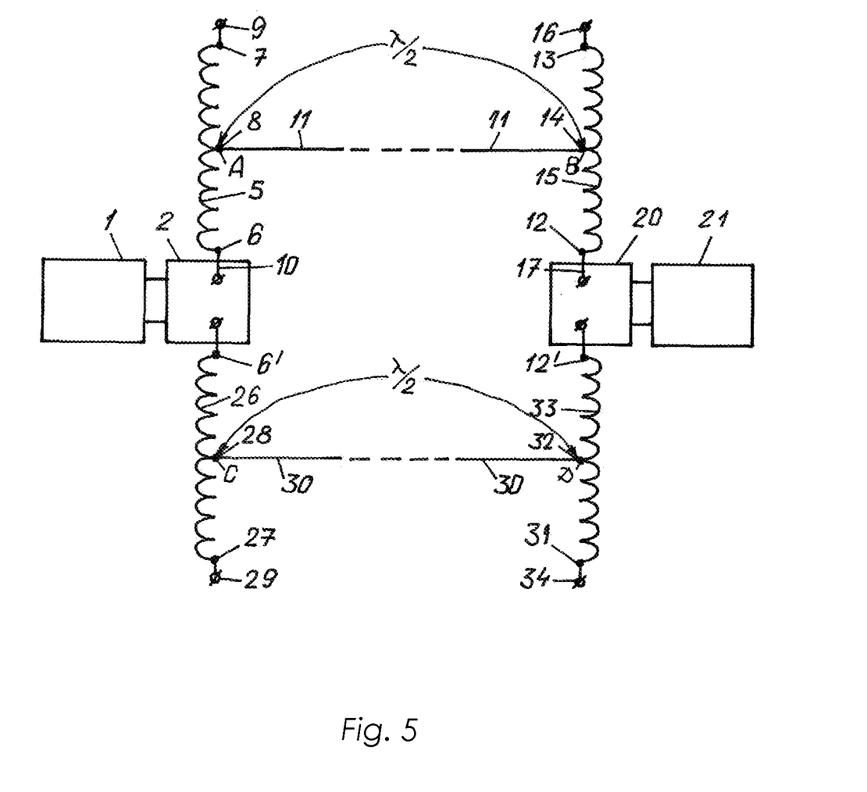

FIG. 5 is a schematic diagram of the electrical connections of the method and apparatus for transmission of electrical energy from the source 1 of electrical energy using two half-wave Tesla transformers 5 and 15 and two single-wire lines 11 and 30. The frequency converter 2 and the load 21, or inverter 20, are included immediately in interruptions 6 and 12 of the resonant half-wave windings 5 and 15. The transmission lines 11 and 30 are included between the terminals (8, 14) and (28, 32) of the windings 5 and 15. The terminals (8, 14) are connected to the terminal points (A, B), the terminals (28, 32) are connected to the points (C, D) between which the electrical energy is transmitted. One half-wave of a standing wave of current rests on each of the transmission lines (11, 30), at the frequency of resonance of the half-wave windings 5 and 15.

Figure 6:
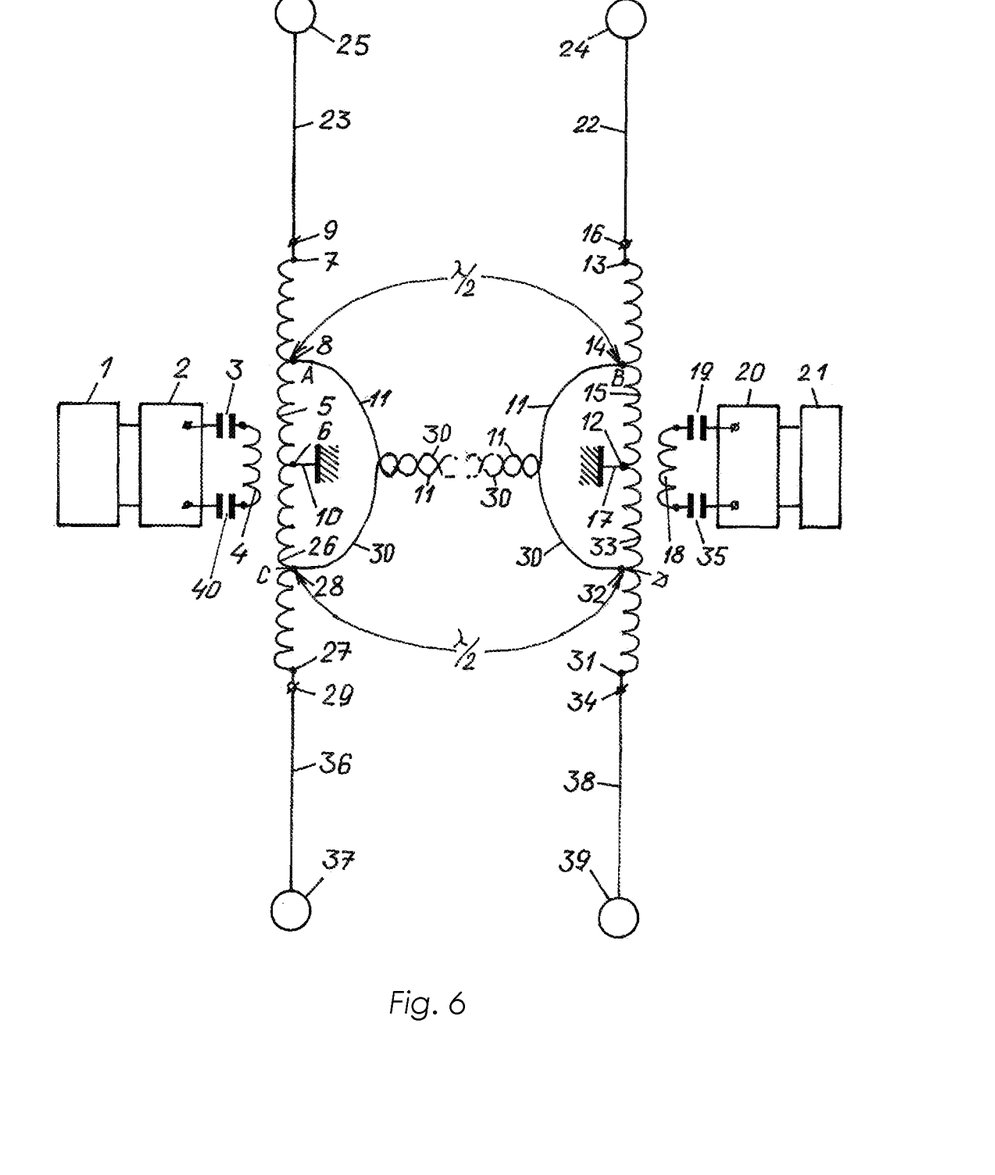
FIG. 6 is a schematic diagram of electrical connections for implementing the method and apparatus for transmission of electrical energy using two single-wire lines made in the form of twisted pair and two resonant Tesla transformers, the middles of half-wave windings of which are grounded. The beginnings and ends of the single-wire transmission lines are connected to the half-wave windings of the Tesla transformers at points A, B, C, D, at which the output resistances of the windings are equal in absolute value to the wave resistances of the transmission lines at the inputs and outputs. The high-potential outputs of the half-wave resonant windings are connected using conductors to electrically conductive spheres.

FIG. 6 is a schematic diagram of the electrical connections of the method and apparatus for transmission of electrical energy using two single-wire lines 11 and 30 made in the form of twisted pair and two resonant Tesla transformers 5 and 15, the middles of the half-wave windings at points 6 and 12 are grounded immediately near the transformers by conductors 10 and 17. The beginnings and ends of the transmission lines 11 and 30 are connected to points A, C, B, D of the half-wave Tesla transformers, in which the output resistances are equal in absolute value to the wave resistances of the windings 5, 15. The high-potential terminals 9, 29, 16, 34 of the resonant transformers 5, 15 are connected by conductors 23, 36, 22, 38 to electrically conductive spheres 25, 37, 24, 39. The lengths of the conductors 23, 36, 22, 38 are at least 5 times greater than the diameters of the spheres 25, 37, 24, 39.

The electromagnetic phenomena formed around the solenoidal windings of the quarter-wave Tesla transformers, when implementing the proposed methods and apparatuses for transmission of electrical energy, can be described using "telegrapher's equations":

$$\begin{cases} -\frac{\partial u}{\partial x} = r_0 i + L_0 \frac{\partial i}{\partial t}, \\ -\frac{\partial i}{\partial x} = g_0 u + C_0 \frac{\partial u}{\partial t}. \end{cases} \quad (1)$$

Here: u is the potential with respect to ground in the coordinate x, at the moment of time t, [B];

i is the current in the conductor of the winding in the coordinate x, at the moment of time t, [A];

$r_0$ is the resistance per unit length to the electrical current of the conductor of the winding, [Ohm/m];

$g_0$ is the conductivity per unit length of the medium between the conductor of the winding and the ground, [S/m];

$L_0$ is the inductance per unit length of the resonant winding, [H/m];

$C_0$ is the ground capacitance per unit length of the resonant winding, [F/m].

Equations (1) are valid for any changes in current i and voltage U in time. Provided that the supply is performed by a sinusoidal voltage, in the steady state, using complex representations for currents and voltages, one obtains from (1):

$$\begin{cases} -\frac{\partial \dot{U}}{\partial x} = (r_0 + j\omega L_0)\dot{I} = Z_0 \dot{I}, \\ -\frac{\partial \dot{I}}{\partial x} = (g_0 + j\omega C_0)\dot{U} = Y_0 \dot{U}. \end{cases} \quad (2)$$

Here: $Z_0 = (r_0 + j\omega L_0)$ is the complex resistance per unit length of the winding, [Ohm/m];

$Y_0 = (g_0 + j\omega C_0)$ is the complex conductivity per unit length of the medium around the winding, [S/m].

In (2), the quantities U and I are functions only of x.

After differentiation with respect to x, the system (2) becomes:

$$\begin{cases} -\frac{d^2 \dot{U}}{dx^2} = Z_0 \frac{d\dot{I}}{dx}, \\ -\frac{d^2 \dot{I}}{dx^2} = Y_0 \frac{d\dot{U}}{dx}. \end{cases} \quad (3)$$

Using (1), the system (3) is transformed into a system of second-order differential equations with constant coefficients, the solution to which is as follows:

$$\dot{U} = \dot{A}_1 e^{-\gamma x} + \dot{A}_2 e^{\gamma x} = \dot{A}_1 e^{-\alpha x} \cdot e^{-j\beta x} + \dot{A}_2 e^{\alpha x} \cdot e^{j\beta x} \quad (4)$$

Here, $\gamma$ is the propagation constant, [m$^{-1}$];

$$\gamma = \alpha + j\beta = \sqrt{Z_0 Y_0} = \sqrt{(r_0 + j\omega L_0)(g_0 + j\omega C_0)} \quad (5)$$

$\alpha$ is the attenuation coefficient, [dB/m];

$\beta$ is the phase coefficient, [rad/m];

$\dot{A}_1$, $\dot{A}_2$ are complex integration constants.

$$\dot{I} = -\frac{1}{Z_c} \frac{\partial \dot{U}}{\partial x} = \frac{\gamma}{Z_c}(\dot{A}_1 e^{-\gamma x} - \dot{A}_2 e^{\gamma x}) = \frac{\dot{A}_1 e^{-\gamma x} - \dot{A}_2 e^{\gamma x}}{\sqrt{\frac{Z_0}{Y_0}}} \quad (6)$$

Here:

$$\sqrt{\frac{Z_0}{Y_0}} = Z_c$$

is the wave resistance of the winding, [Ohm];

After rearrangement and regrouping, (4) and (6) become:

$$\begin{cases} \dot{U} = \dot{U}_1 ch\gamma x - \dot{I}_1 Z_c sh\gamma x, \\ \dot{I} = \frac{-\dot{U}_1}{Z_c} sh\gamma x + \dot{I}_1 ch\gamma x. \end{cases} \quad (7)$$

Here: $\dot{U}$, $\dot{I}$ are voltage and current complexes with current coordinates x along the winding;

$\dot{U}_1$, $\dot{I}_1$ are complexes of voltages and currents at the beginning of the winding (low-potential terminal);

ch, sh are hyperbolic functions of cosine and sine.

The expression (7) may be rearranged to become one using voltage and current at the end of the winding (high-potential terminal). Thereby, $U_2$ and $I_2$ of the end of the winding become independent. In this case, the coordinates are measured from the end of the winding:

$$\begin{cases} \dot{U} = \dot{U}_2 ch\gamma x + \dot{I}_2 Z_c sh\gamma x, \\ \dot{I} = \frac{\dot{U}_2}{Z_c} sh\gamma x + \dot{I}_2 ch\gamma x. \end{cases} \quad (8)$$

The input resistance of the winding in the coordinate x:

$$Z_X = \frac{\dot{U}_X}{\dot{I}_X}.$$

Thus, at the beginning of the winding:

$$Z_{IN1} = \frac{\dot{U}_1}{\dot{I}_1};$$

At the end of the winding:

$$Z_{IN2} = \frac{\dot{U}_2}{\dot{I}_2};$$

In case of small energy losses in the winding ($r_0=0$, $g_0=0$), the propagation constant $\gamma$ and $Z_C$ will be equal to:

$$\gamma = \alpha + j\beta = \sqrt{(r_0 + j\omega L_0)(g_0 + j\omega C_0)} = \sqrt{j\omega L_0 \cdot j\omega C_0} = j\omega\sqrt{L_0 C_0} = j\frac{\omega}{V_0} = j\beta;$$

Here:

$$V_0 = \frac{1}{\sqrt{L_0 C_0}}$$

is the wave speed in the winding, [m/s];

$$Z_C = \sqrt{\frac{Z_0}{Y_0}} = \sqrt{\frac{r_0 + j\omega L_0}{g_0 + j\omega C_0}} = \sqrt{\frac{L_0}{C_0}}.$$

Accordingly, (8), under assumption $r_0=0$, $g_0=0$, simplify to:

$$\begin{cases} \dot{U} = \dot{U}_2 chj\frac{\omega}{V_0}x + \dot{I}_2 Z_C shj\frac{\omega}{V_0}x = \dot{U}_2 chj\beta x + \dot{I}_2 Z_C shj\beta x, \\ \dot{I} = \frac{\dot{U}_2}{Z_C}shj\frac{\omega}{V_0}x + \dot{I}_2 chj\frac{\omega}{V_0}x = \frac{\dot{U}_2}{Z_C}sh\beta x + \dot{I}_2 ch\beta x. \end{cases} \quad (9)$$

The hyperbolic functions of imaginary argument are rearranged into circular ones:

$$\begin{cases} \dot{U} = \dot{U}_2 \cos\left(\frac{\omega}{V_0}x\right) + j\dot{I}_2 Z_C \sin\left(\frac{\omega}{V_0}x\right) \\ \dot{I} = j\frac{\dot{U}_2}{Z_C}\sin\left(\frac{\omega}{V_0}x\right) + \dot{I}_2 \cos\left(\frac{\omega}{V_0}x\right) \end{cases} \quad (10)$$

For the case of no load, when $i_2=0$, $Z_2=\infty$, the relations (10) will become:

$$\begin{cases} \dot{U} = \dot{U}_2 \cos\beta x \\ \dot{I} = j\frac{\dot{U}_2}{Z_C}\sin\beta x \end{cases} \quad (11)$$

By switching from complexes to instantaneous values u, i, one obtains:

$$\begin{cases} u = U_{2max}\cos\beta x \cdot \sin\omega t \\ i = \frac{U_{2max}}{Z_C}\sin\beta x \cdot \cos\omega t \end{cases} \quad (12)$$

The expression (12) is the equations of standing waves, the quantities of voltages and currents of which vary in time with angular frequency $\omega$ of alternating current and with a varying amplitude along the line under the law $\cos\beta x$ and $\sin\beta x$.

In case of short circuit at the end of the line:

$$\begin{cases} \dot{U} = j\dot{I}_2 Z_C \sin\beta x \\ \dot{I} = \dot{I}_2 \cos\beta x \end{cases} \quad (13)$$

Or for instantaneous values:

$$\begin{cases} u = I_{2max} Z_C \sin\beta x \cdot \cos\omega t \\ i = I_{2max} \cos\beta x \cdot \sin\omega t \end{cases} \quad (14)$$

In accordance with (12) and (14), the input resistance of lossless lines, in the case of no load, is equal to:

$$Z_{nl} = -jZ_C ctg\beta x = -jZ_C ctg\frac{2\pi}{\lambda}x \quad (15)$$

The input resistance of a lossless line, in the case of a short circuit, at the end of the line will be:

$$Z_{sc} = -jZ_C tg\beta x = -jZ_C tg\frac{2\pi}{\lambda}x. \quad (16)$$

The expression (12) can be presented as the sum and difference of two, opposed relative to each other, voltage and current waves:

$$\begin{cases} u = \frac{U_{2max}}{2}[\sin(\omega t + \beta x) + \sin(\omega t - \beta x)] \\ i = \frac{U_{2max}}{2Z_C}[\sin(\omega t + \beta x) - \sin(\omega t - \beta x)] \end{cases} \quad (17)$$

The expression (14), similarly, is the sum and difference of opposing waves:

$$\begin{cases} u = \frac{I_{2max}}{2}Z_C[\sin(\omega t + \beta x) + \sin(\omega t - \beta x)] \\ i = \frac{U_{2max}}{2}[\sin(\omega t + \beta x) - \sin(\omega t - \beta x)] \end{cases} \quad (18)$$

Since the phase constant $\beta$ of wave is equal to $$\beta = \frac{\omega}{V_0} = \frac{2\pi \cdot T}{T \cdot \lambda} = \frac{2\pi}{\lambda},$$

where $\lambda$ is the length of wave in the winding, then the input resistance of the winding of $\lambda=\lambda/2$ long and shorted at the end according to (16) will be:

$$Z_{lNsc} = jZ_C tg\frac{2\pi}{\lambda}\frac{\lambda}{2} = jZ_C tg\pi = 0 \text{ [Ohm]}$$

In case of no load, the input resistance of the half-wave segment of the winding according to (15) will be:

$$Z_{INnl} = -jZ_C ctg\frac{2\pi}{\lambda}\frac{\lambda}{2} = -jZ_C ctg\pi = \infty[\text{Ohm}]$$

Thus, the half-wave segment of the winding "translates" to the input the quantity of the output resistance.

For a winding having a length of a quarter of wavelength $X=\lambda/4$, the input resistance in case of interruption at the end (no load) according to (15):

$$Z_{IN_{nl}} = -jZ_C ctg\frac{2\pi}{\lambda}\frac{\lambda}{4} = -jZ_C ctg\frac{\pi}{2} = 0[\text{Ohm}]$$

In the case of a short circuit, the quarter-wave winding, at the input, will have an input resistance according to (16):

$$Z_{INsc} = jZ_C tg\frac{2\pi}{\lambda}\frac{\lambda}{4} = jZ_C mg\frac{\pi}{2} = \infty[\text{Ohm}]$$

Conclusion: the quarter-wave segment "inverts", to the input, the resistance of output circuit. Since the resistance along the quarter-wave segment for the case of no load varies from infinity to zero, it is possible to determine in which coordinate X over the length of the winding the input resistance will be equal in absolute value to the wave one $Z_C$. According to (15), one has:

$$|Z_{INnl}| = \left|-jZ_C ctg\frac{2\pi}{\lambda}x\right| = \left|Z_C ctg\frac{2\pi}{\lambda}x\right| = Z_C[\text{Ohm}]$$

From which:

$$ctg\frac{2\pi}{\lambda}x = 1.$$

Therefore, $$\frac{2\pi}{\lambda}x = \frac{\pi}{4}x = \frac{\lambda}{8}.$$

Thus, the point with the coordinate X from the unconnected high-potential end is located in the middle of the winding, since the entire length of the winding of the quarter-wave transformer is equal to $$\frac{\lambda}{4}.$$

Voltage and current at the point $$x = \frac{\lambda}{8}$$

can be determined by (12):

$$\begin{cases} u_{\lambda/8} = \dot{U}_2 \cos\frac{\pi}{8} \cdot \sin\omega t = \frac{\dot{U}_2}{\sqrt{2}}\sin\omega t \\ i_{\lambda/8} = \frac{\dot{U}_2}{Z_c}\sin\frac{\pi}{8}\cdot\cos\omega t = j\frac{\dot{U}_2}{\sqrt{2}}\cdot\frac{1}{Z_c}\sin\omega t \end{cases} \quad (19)$$

The output resistance in absolute value at the point $$x = \frac{\lambda}{8}$$

an accordance with (19) is indeed equal to $Z_C$:

$$|Z_{\lambda/8}| = \left|\frac{u}{i}\right| = \left|\frac{\dot{U}_2\sqrt{2}Z_C\sin\omega t}{j\sqrt{2}\dot{U}_2\sin\omega t}\right| = Z_C. \quad (20)$$

Points with the coordinates $$x = \frac{\lambda}{8}$$

from the high-potential ends 7, 13, 27, 31 are indicated by numbers 8, 14, 28, 32. Since the points 8, 14, 28, 32 are the middles of the windings 5, 15, 26, 33, then the distance between the points 8, 14, 28, 32, low-potential terminals 6, 6, 12, 12, of windings 5, 15, 26, 33 is also equal to $$x = \frac{\lambda}{8}$$

The midpoints 8, 14, 28, 32 of the windings 5, 15, 26, 33 are output to the terminals A, B, C, D of the resonant transformers 5, 15, 26, 33 for connecting thereto the beginnings and ends of the transmission lines 11 and 30.

The expression (19) shows that in the midpoints 8, 14, 28, 32 of the windings 5, 15, 26, 33, the output resistances in absolute value are equal to $Z_C$, the voltages are $\sqrt{2}$ times lower than the potentials at the points 7, 13, 27, 31, i.e. at the high-potential terminals 9, 16, 29, 34, where potential antinodes are formed, and currents are $\sqrt{2}$ less than those at the points 6, 6, 12, 12, where current nodes of the resonant quarter-wave Tesla transformers 5, 15, 26, 33 are formed. Thus, the voltage and current in the transmission line are reduced as compared to high-potential and low-potential transmission technologies, in which either a potential antinode, or a current antinode occur on the transmission line.

Examples of implementation of the method and apparatus for transmission of electrical energy.

Example 1

The transmitting 5 and receiving 15 Tesla transformers are made of copper single wire in insulation. The diameter of the wire over copper is $d_C$=1.8 mm. The diameter of the wire in insulation is $d_f$=2.27 mm. The winding density is $n_0$=440 turns per meter. The diameter of the former is 300 mm. The tangent of the angle of approach of the winding is tgθ=2.41 $10^{-3}$. The winding length is 1.37 m. The inductance per unit length of the winding is $L_0$=0.01724 (H/m). The design inductance of the resonant winding is 23.6 mH. The practical control of the inductance of the manufactured winding showed L=24.2 mH.

The design own ground capacitance of the winding was C=152 $10^{-12}$ F. The design wave resistance of the winding was:

$$Z_C = \sqrt{\frac{L}{C}} = \frac{24,2 \cdot 210^{-3}}{152 \cdot 10^{-12}} = 12,6 \text{ kOhm.}$$

The design resonant frequency was—

$$f_{0des} = \frac{1}{2\pi\sqrt{LC}} = \frac{1}{2\pi\sqrt{24,2 \cdot 10^{-3} \cdot 152 \cdot 10^{-12}}} = 83,025 \text{ kHz.}$$

The real resonant frequency was $f_0$=83.40 kHz. During transmission of energy, the voltage at the power terminal 8 of the resonant winding of the transmitting transformer 5 was 5 kV. The potential of the isolated high-voltage terminal 9 of the transmitting transformer 5 was 7.1 kV. The current in the transmission line 11 was 0.38 A. The power formed at the load was 1860 W. The power at the output of the generator 2 was 1980 W. The generator voltage was $U_G$=380 volts, the generator current was $I_G$=4.9 A. The transmission efficiency was 0.94.

Example 2

The transmitting 5 and receiving 15 Tesla transformers are made of copper single wire in insulation. The diameter of the wire over copper is $d_C$=2.6 mm. The diameter of the wire in insulation is $d_I$=10 mm. The winding density is $n_0$=100 turns per meter. The total number of turns n is 300 turns. The winding length is 3.0 m. The length of the winding wire is 1130 m. The diameter of the former is 1.2 m. The former is made of impregnated vacuum-dried pine timber. The winding is formed in one layer, in turn to turn relation. The tangent of the angle of approach of the winding was tgθ=2,7 $10^{-3}$. The inductance per unit length of the winding was $L_0$=0.0137 (H/m). The design inductance of the resonant winding was L=$L_0$·b=0.0137·3.0=0.041 H. The design own capacitance of the winding to the ground was C=334 $10^{-12}$ F. The wave resistance of the winding was $Z_C$=11.1 kOhm.

The design resonant frequency was $f_0$=43.0 kHz.

During transmission of energy, the voltage at the power wire 8 of the resonant winding of the transmitting transformer 5 reached 25 kV. The potential of the isolated high-voltage terminal 9 of the transmitting transformer 5 was 35 kV. The current in the transmission line 11 was 10.5 A. The current in the grounding terminal was 15 A. The power in the load was 250 kW. The power at the generator output was 263 kW. The efficiency was η=0.952.

Thus, the use of the proposed invention results in improved transmission efficiency. Due to the use of the full mechanism of transmission of electrical energy, there is arranged, in the transmission line between the terminals with natural parameters of the output resistances of the windings of the Tesla transformers, the transmission of energy with the voltage and current that are maximally similar in phase. Thereby, the voltage on the transmission line 11 is $\sqrt{2}$ times lower than the potential at the high-voltage terminal 9, the current in the line 11 is $\sqrt{2}$ times less than the current in the grounding terminal 6 of the resonant winding 5.

Absence of potential antinode and current antinode on the transmission line in the proposed methods and apparatuses for transmission of electrical energy results in reduced cost of the transmission system, reduced intensity of the electrical and magnetic fields under the transmission line, reduced cost of operation of the transmission lines. The fact that the voltage on the transmission line is reduced results in reduced requirements for the level of electrical strength of the fastening and supporting hardware, which fact ensures reduced capital costs during the construction of the transmission lines.

What is claimed is:

1. A method for transmission of electrical energy comprising: transmitting electrical energy from the source of electrical energy to the receiver of electrical energy using a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers, the low-potential terminals of the windings of said Tesla transformer being grounded, and an electrical energy transmission line, wherein the transmission line is included between the stationary or movable points of the resonant windings of the transmitting and receiving Tesla transformer, the output resistance in which corresponds to the input or output resistance of the transmission line, the frequency converter is connected to the transmitting Tesla transformer via an electrical capacitor using a coupling winding magnetically-inductively coupled to the winding of the transmitting Tesla transformer, the receiver of electrical energy is connected to the receiving Tesla transformer via an electrical capacitor using a coupling winding magnetically-inductively coupled to the winding of the receiving Tesla transformer, and said method further comprises: excitating, by means of electrical energy from the source of electrical energy, in the winding of the transmitting Tesla transformer, resonant oscillations with the provision of excitation of electrical current in the transmission line, transmitting the energy via the transmission line to the winding of the receiving Tesla transformer with excitation therein of resonant oscillations, to transmit energy from the receiving Tesla transformer to the receiver of electrical energy.

2. The method for transmission of electrical energy according to claim 1, wherein the energy is transmitted to the receiver of electrical energy further via a current inverter converting the energy of elevated-frequency current into the energy of electrical current suitable for supplying the load.

3. The method for transmission of electrical energy according to claim 1, wherein the high-potential terminals of the windings of the transmitting and receiving Tesla transformer are connected to solitary capacitors.

4. The method for transmission of electrical energy according to claim 3, wherein the solitary capacitors are made in the form of current-conducting spheres or toroids.

5. The method for transmission of electrical energy according to claim 1, wherein the transmission line is a single-wire transmission line.

6. A method for transmission of electrical energy comprising: transmitting electrical energy from the source of electrical energy to the receiver of electrical energy using a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers and an electrical energy transmission line, wherein the transmission line is included between the stationary or movable points of the resonant windings of the transmitting and receiving Tesla transformer, the output resistance in which corresponds to the input or output resistance of the transmission line, the frequency converter is included between the low-potential terminal of the resonant winding of the transmitting Tesla transformer and the grounding connection, the receiver of electrical energy is included between the low-potential terminal of the resonant winding of the receiving Tesla transformer and the grounding connection, and said method further comprises: exciting, by means of electrical energy from the source of electrical energy, in the winding of the transmitting Tesla transformer, resonant oscillations with the provision of excitation of electrical current in the transmission line, and transmitting the energy via the transmission line to the winding of the receiving Tesla transformer with excitation therein of resonant oscillations, which fact to transmit energy from the receiving Tesla transformer to the receiver of electrical energy.

7. The method for transmission of electrical energy according to claim 6, wherein the receiver of electrical energy is connected to the low-potential terminal of the resonant winding of the receiving Tesla transformer via a current inverter converting the energy of elevated-frequency current into the energy of electrical current suitable for supplying the load.

8. The method for transmission of electrical energy according to claim 6, wherein the high-potential terminals of the resonant windings of the transmitting and receiving Tesla transformer are connected to solitary capacitors.

9. The method for transmission of electrical energy according to claim 8, wherein the solitary capacitors are made in the form of current-conducting spheres or toroids.

10. The method for transmission of electrical energy according to claim 6, wherein the transmission line is a single-wire transmission line.

11. A method for transmission of electrical energy comprising: transmitting electrical energy from the source of electrical energy to the receiver of electrical energy using a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers, and two electrical energy transmission lines, wherein the both transmission lines are included between the stationary or movable points of the resonant windings of the transmitting and receiving Tesla transformer, the output resistance in which corresponds to the input or output resistance of the transmission line, the frequency converter is connected to the transmitting Tesla transformer via electrical capacitors using a coupling winding magnetically-inductively coupled to the winding of the transmitting Tesla transformer, the receiver of electrical energy is connected to the receiving Tesla transformer via electrical capacitors using a coupling winding magnetically-inductively coupled to the half-wave winding of the receiving Tesla transformer, and said method further comprises: exciting, by means of electrical energy from the source of electrical energy, in the winding of the transmitting Tesla transformer, resonant oscillations with the provision of excitation of electrical current in the transmission lines, transmitting the energy via the transmission lines to the winding of the receiving Tesla transformer with excitation therein of resonant oscillations, to transmit energy from the receiving Tesla transformer to the receiver of electrical energy.

12. The method for transmission of electrical energy according to claim 11, wherein the transmission lines are single-wire transmission lines.

13. The method for transmission of electrical energy according to claim 12, wherein the single-wire transmission lines are made separately from each other.

14. The method for transmission of electrical energy according to claim 12, wherein the single-wire transmission lines are made integral with each other in the form of isolated twisted pair with the required level of electric strength between the transmission lines and between the transmission lines and ground.

15. The method for transmission of electrical energy according to claim 11, wherein the middles of the windings of the transmitting and receiving Tesla transformers are grounded.

16. The method for transmission of electrical energy according to claim 11, wherein the energy is transmitted to the receiver of electrical energy further via a current inverter converting the energy of elevated-frequency current into the energy of electrical current suitable for supplying the load.

17. The method for transmission of electrical energy according to claim 11, wherein the high-potential terminals of the windings of the transmitting and receiving Tesla transformer are connected to solitary capacitors.

18. The method for transmission of electrical energy according to claim 17, wherein the solitary capacitors are made in the form of current-conducting spheres or toroids.

19. A method for transmission of electrical energy comprising: transmitting electrical energy from the source of electrical energy to the receiver of electrical energy using a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers, and two electrical energy transmission lines, wherein the both transmission lines are included between the stationary or movable points of the resonant windings of the transmitting and receiving Tesla transformer, the output resistance in which corresponds to the input or output resistance of the transmission line, the frequency converter is connected to the transmitting Tesla transformer by way of including the electrical output of the frequency converter in series with the conductor in the resonant winding of the transmitting Tesla transformer, the receiver of electrical energy is connected to the receiving Tesla transformer by way of including the electrical input of the receiver in series with the conductor in the resonant winding of the receiving Tesla transformer; and said method further comprises: exciting, by means of electrical energy from the source of electrical energy, in the winding of the transmitting Tesla transformer, resonant oscillations with the provision of excitation of electrical current in the transmission lines, transmitting the energy via the transmission lines to the winding of the receiving Tesla transformer with excitation therein of resonant oscillations, to transmit energy from the receiving Tesla transformer to the receiver of electrical energy.

20. The method for transmission of electrical energy according to claim 19, wherein the energy is transmitted to the receiver of electrical energy further via a current inverter converting the energy of elevated-frequency current into the energy of electrical current suitable for supplying the load.

21. The method for transmission of electrical energy according to claim 19, wherein the transmission lines are single-wire transmission lines.

22. The method for transmission of electrical energy according to claim 19, wherein the single-wire transmission lines are made separately from each other.

23. The method for transmission of electrical energy according to claim 19, wherein the single-wire transmission lines are made integral with each other in the form of isolated twisted pair with the required level of electric strength between the transmission lines and between the transmission lines and ground.

24. The method for transmission of electrical energy according to claim 19, wherein the high-potential terminals of the windings of the transmitting and receiving Tesla transformer are connected to solitary capacitors.

25. The method for transmission of electrical energy according to claim 24, wherein the solitary capacitors are made in the form of current-conducting spheres or toroids.

26. An apparatus for transmission of electrical energy comprising: a source and a receiver of electrical energy, a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers, the low-potential terminals of the windings of said transformers being grounded, and an electrical energy transmission line, wherein Tesla transformer the transmission line is included between the stationary or movable points of the resonant windings of the transmitting and receiving Tesla transformer, the output resistance in which corresponds to the input or output resistance of the transmission line, the frequency converter is connected to the transmitting Tesla transformer via an electrical capacitor using a coupling winding magnetically-inductively coupled to the winding of the transmitting Tesla transformer, the receiver of electrical energy is connected to the receiving Tesla transformer via an electrical capacitor using a coupling winding magnetically-inductively coupled to the winding of the receiving Tesla transformer, the source of electrical energy provides the possibility of excitation, by means of electrical energy, in the winding of the transmitting Tesla transformer, of resonant oscillations with excitation of electrical current in the transmission line, and the transmission line provides the possibility of transmission of energy through same to the winding of the receiving Tesla transformer with excitation therein of resonant oscillations, to transmit energy from the receiving Tesla transformer to the receiver of electrical energy.

27. The apparatus for transmission of electrical energy according to claim 26, further comprising a current inverter through which energy is further transmitted to the receiver of electrical energy and which converts the energy of elevated-frequency current into the energy of electrical current suitable for supplying the load.

28. The apparatus for transmission of electrical energy according to claim 26, wherein the high-potential terminals of the windings of the transmitting and receiving Tesla transformer are connected to solitary capacitors.

29. The apparatus for transmission of electrical energy according to claim 28, wherein the solitary capacitors are made in the form of current-conducting spheres or toroids.

30. The apparatus for transmission of electrical energy according to claim 26, wherein the transmission line is a single-wire transmission line.

31. An apparatus for transmission of electrical energy comprising: a source and a receiver of electrical energy, a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers, and an electrical energy transmission line, wherein the transmission line is included between the stationary or movable points of the resonant windings of the transmitting and receiving Tesla transformer, the output resistance in which corresponds to the input or output resistance of the transmission line, the frequency converter is included between the low-potential terminal of the resonant winding of the transmitting Tesla transformer and the grounding connection, the receiver of electrical energy is included between the low-potential terminal of the resonant winding of the receiving Tesla transformer and the grounding connection, the source of electrical energy provides the possibility of excitation, by means of electrical energy, in the winding of the transmitting Tesla transformer, of resonant oscillations with excitation of electrical current in the transmission line, and the transmission line provides the possibility of transmission of energy through same to the winding of the receiving Tesla transformer with excitation therein of resonant oscillations, to transmit energy from the receiving Tesla transformer to the receiver of electrical energy.

32. The apparatus for transmission of electrical energy according to claim 31, wherein the receiver of electrical energy is connected to the low-potential terminal of the resonant winding of the receiving Tesla transformer via a current inverter converting the energy of elevated-frequency current into the energy of electrical current suitable for supplying the load.

33. The apparatus for transmission of electrical energy according to claim 31, wherein the high-potential terminals of the resonant windings of the transmitting and receiving Tesla transformer are connected to solitary capacitors.

34. The apparatus for transmission of electrical energy according to claim 33, wherein the solitary capacitors are made in the form of current-conducting spheres or toroids raised above the ground.

35. The apparatus for transmission of electrical energy according to claim 31, wherein the transmission line is a single-wire electrical energy transmission line.

36. An apparatus for transmission of electrical energy comprising: a source and a receiver of electrical energy, a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers, and two electrical energy transmission lines, wherein the both transmission lines are included between the stationary or movable points of the resonant windings of the transmitting and receiving Tesla transformer, the output resistance in which corresponds to the input or output resistance of the transmission line, the frequency converter is connected to the transmitting Tesla transformer via electrical capacitors using a winding magnetically-inductively coupled to the winding of the transmitting Tesla transformer, the receiver of electrical energy is connected to the receiving Tesla transformer via electrical capacitors using a coupling winding magnetically-inductively coupled to the half-wave winding of the receiving Tesla transformer, the source of electrical energy provides the possibility of excitation, by means of electrical energy, in the winding of the transmitting Tesla transformer, of resonant oscillations with excitation of electrical current in the transmission lines, and the transmission lines provides the possibility of transmission of energy through same to the winding of the receiving Tesla transformer with excitation therein of resonant oscillations, to transmit energy from the receiving Tesla transformer to the receiver of electrical energy.

37. The apparatus for transmission of electrical energy according to claim 36, wherein the transmission lines are single-wire transmission lines.

38. The apparatus for transmission of electrical energy according to claim 37, wherein the single-wire transmission lines are made separately from each other.

39. The apparatus for transmission of electrical energy according to claim 37, wherein the single-wire transmission lines are made integral with each other in the form of isolated twisted pair with the required level of electric strength between the transmission lines and between the transmission lines and ground.

40. The apparatus for transmission of electrical energy according to claim 36, wherein the middles of the windings of the transmitting and receiving Tesla transformers are grounded.

41. The apparatus for transmission of electrical energy according to claim 36, further comprising a current inverter through which energy is further transmitted to the receiver of electrical energy and which converts the energy of elevated-frequency current into the energy of electrical current suitable for supplying the load.

42. The apparatus for transmission of electrical energy according to claim 36, wherein the high-potential terminals of the windings of the transmitting and receiving Tesla transformer are connected to solitary capacitors.

43. The apparatus for transmission of electrical energy according to claim 42, wherein the solitary capacitors are made in the form of current-conducting spheres or toroids.

44. An apparatus for transmission of electrical energy comprising: a source and a receiver of electrical energy, a frequency converter for converting electrical current from the source of electrical energy to elevated-frequency electrical current, transmitting and receiving resonant Tesla transformers, the resonant Tesla transformers comprising resonant step-up windings having single-layer quarter-wave segments of lines on cylindrical formers, and two electrical energy transmission lines, wherein the both transmission lines are included between the stationary or movable points of the resonant windings of the transmitting and receiving Tesla transformer, the output resistance in which corresponds to the input or output resistance of the transmission line, the frequency converter is connected to the Tesla transformer by way of including the electrical output of the frequency converter in series with the conductor in the resonant winding of the transmitting Tesla transformer, the receiver of electrical energy is connected to the receiving Tesla transformer by way of including the electrical input of the receiver in series with the conductor in the resonant winding of the receiving Tesla transformer, the source of electrical energy provides the possibility of excitation, by means of electrical energy, in the winding of the transmitting Tesla transformer, of resonant oscillations with excitation of electrical current in the transmission lines, and the transmission lines provides the possibility of transmission of energy through same to the winding of the receiving Tesla transformer with excitation therein of resonant oscillations, to transmit energy from the receiving Tesla transformer to the receiver of electrical energy.

45. The apparatus for transmission of electrical energy according to claim 44, further comprising a current inverter through which energy is further transmitted to the receiver of electrical energy and which converts the energy of elevated-frequency current into the energy of electrical current suitable for supplying the load.

46. The apparatus for transmission of electrical energy according to claim 44, wherein the transmission lines are single-wire transmission lines.

47. The apparatus for transmission of electrical energy according to claim 46, wherein the single-wire transmission lines are made separately from each other.

48. The apparatus for transmission of electrical energy according to claim 46, wherein the single-wire transmission lines are made integral with each other in the form of isolated twisted pair with the required level of electric strength between the transmission lines and between the transmission lines and ground.

49. The apparatus for transmission of electrical energy according to claim 44, wherein the high-potential terminals of the windings of the transmitting and receiving Tesla transformer are connected to solitary capacitors.

50. The apparatus for transmission of electrical energy according to claim 49, wherein the solitary capacitors are made in the form of current-conducting spheres or toroids.

* * * * *